US012770232B2

(12) United States Patent
Zhou et al.

(10) Patent No.: US 12,770,232 B2
(45) Date of Patent: Oct. 20, 2026

(54) VIDEO PROCESSING METHOD, DEVICE AND APPARATUS

(71) Applicant: SZ DJI TECHNOLOGY CO., LTD., Shenzhen (CN)

(72) Inventors: Yan Zhou, Shenzhen (CN); Xiaozhen Zheng, Shenzhen (CN); Fei Xue, Shenzhen (CN); Liang Zhao, Shenzhen (CN); Xiongbin Rao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1 day.

(21) Appl. No.: 19/017,379

(22) Filed: Jan. 10, 2025

(65) Prior Publication Data

US 2025/0148578 A1 May 8, 2025

Related U.S. Application Data

(63) Continuation of application No. PCT/CN2022/114915, filed on Aug. 25, 2022.

(51) Int. Cl.
*G06T 5/70* (2024.01)
*G06T 5/73* (2024.01)
(Continued)

(52) U.S. Cl.
CPC .................. *G06T 5/70* (2024.01); *G06T 5/73* (2024.01); *G06T 7/11* (2017.01); *G06T 7/215* (2017.01);
(Continued)

(58) Field of Classification Search
CPC ..... G06T 5/70; G06T 5/73; G06T 7/11; G06T 7/215; G06T 2207/10016;
(Continued)

(56) References Cited

U.S. PATENT DOCUMENTS

2012/0045090 A1* 2/2012 Bobbitt .................... G06T 7/97 382/103
2012/0224629 A1* 9/2012 Bhagavathy ........... H04N 19/46 375/E7.085
(Continued)

FOREIGN PATENT DOCUMENTS

CN 101277447 A 10/2008
CN 111918066 A 11/2020
(Continued)

OTHER PUBLICATIONS

International Search Report of PCT/CN2022/114915 (May 24, 2023).

*Primary Examiner* — Jared Walker

(57) ABSTRACT

A video processing method and device and an apparatus are provided. The method includes: obtaining a video captured by a photographing device; dividing the video into a plurality of regions based on information associated with a global motion state between frames of the video, wherein the plurality of regions includes a region of interest (ROI) and a non-region of interest (non-ROI); and performing different image processing on the ROI and the non-ROI to achieve different levels of clarity for the ROI and the non-ROI. Present disclosure can effectively save transmission resource usage while ensuring the user's subjective visual experience.

18 Claims, 4 Drawing Sheets

(51) Int. Cl.
*G06T 7/11* (2017.01)
*G06T 7/215* (2017.01)

(52) U.S. Cl.
CPC ............... *G06T 2207/10016* (2013.01); *G06T 2207/20021* (2013.01)

(58) Field of Classification Search
CPC ............ G06T 2207/20021; G06T 5/50; H04N 19/142; H04N 19/146; H04N 19/167
See application file for complete search history.

(56) References Cited

U.S. PATENT DOCUMENTS

| | | | | |
|---|---|---|---|---|
| 2016/0267325 | A1* | 9/2016 | Sundaresan | G06T 7/215 |
| 2016/0366365 | A1* | 12/2016 | Iyer | G06F 3/013 |
| 2017/0236288 | A1* | 8/2017 | Sundaresan | G06T 7/215<br>382/173 |
| 2018/0082428 | A1* | 3/2018 | Leung | G06V 10/25 |
| 2020/0137395 | A1* | 4/2020 | Andersson | H04N 19/119 |
| 2021/0272293 | A1* | 9/2021 | Ooishi | H04N 19/167 |
| 2022/0182652 | A1* | 6/2022 | Furht | H04N 19/117 |
| 2022/0303555 | A1* | 9/2022 | Lu | H04N 19/124 |
| 2022/0405874 | A1* | 12/2022 | Barbour | G06V 10/44 |
| 2023/0298276 | A1* | 9/2023 | Patel | H04N 19/115<br>345/419 |

FOREIGN PATENT DOCUMENTS

| | | |
|---|---|---|
| CN | 114531615 A | 5/2022 |
| CN | 114554212 A | 5/2022 |

* cited by examiner

VIDEO PROCESSING METHOD, DEVICE AND APPARATUS

RELATED APPLICATIONS

This application is a continuation application of PCT application No. PCT/CN2022/114915, filed on Aug. 25, 2022, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of video processing technology, and in particular to a video processing method and device, and an apparatus.

BACKGROUND

In image transmission applications, it is typically necessary to transmit captured images or videos in real-time or with low latency, which requires substantial transmission resources. Traditionally, a uniform encoding strategy is applied to all areas within a single image frame. However, under limited transmission resources, a uniform encoding strategy fails to provide users with a clear view of the region of interest (ROI). Therefore, how to save transmission bandwidth while ensuring the user's subjective visual quality experience is an urgent problem that needs to be addressed.

SUMMARY

To address the above issues, present disclosure provides a video processing method and device, an apparatus, and a computer storage medium, in order to reduce transmission bandwidth.

In a first aspect, some exemplary embodiments of present disclosure provide a video processing method, which includes: obtaining a video captured by a photographing device; dividing the video into a plurality of regions based on information associated with a global motion state between frames of the video, where the plurality of regions includes a region of interest (ROI) and a non-region of interest (non-ROI); and performing different image processing on the ROI and the non-ROI to achieve different levels of clarity for the ROI and the non-ROI.

In a second aspect, some exemplary embodiments of present disclosure provide a video processing device, including: at least one storage medium storing at least one set of instructions; and at least one processor in communication with the at least one storage medium, where during operation, the at least one processor executes the at least one set of instructions to cause the device to at least: obtain a video captured by a photographing device, divide the video into a plurality of regions based on information associated with a global motion state between frames of the video, where the plurality of regions includes a region of interest (ROI) and a non-region of interest (non-ROI), and perform different image processing on the ROI and the non-ROI to achieve different levels of clarity for the ROI and the non-ROI.

In a third aspect, some exemplary embodiments of present disclosure provide an apparatus, including: a photographing device, mounted on the apparatus; at least one storage medium storing at least one set of instructions; and at least one processor in communication with the at least one storage medium, where during operation, the at least one processor executes the at least one set of instructions to cause the apparatus to at least: obtain a video captured by the photographing device, divide the video into a plurality of regions based on information associated with a global motion state between frames of the video, where the plurality of regions includes a region of interest (ROI) and a non-region of interest (non-ROI), and perform different image processing on the ROI and the non-ROI to achieve different levels of clarity for the ROI and the non-ROI.

The video processing method of the embodiments of present disclosure can divide a video into a ROI region(s) and a non-ROI region(s) based on information associated with a global motion state between frames of the video. Different image processing methods are then applied to the ROI and non-ROI regions in the video, so that the clarity of the ROI and non-ROI regions differs. The video processing methods herein can improve a user's subjective video quality experience, while also reducing the overall consumption of transmission resources, enhancing transmission timeliness.

BRIEF DESCRIPTION OF THE DRAWINGS

In order to more clearly illustrate the technical solutions of the embodiments of present disclosure or in the existing/traditional technology, a brief introduction to the drawings used in the embodiments will be provided below.

MAIN REFERENCE COMPONENTS

Figure 1:
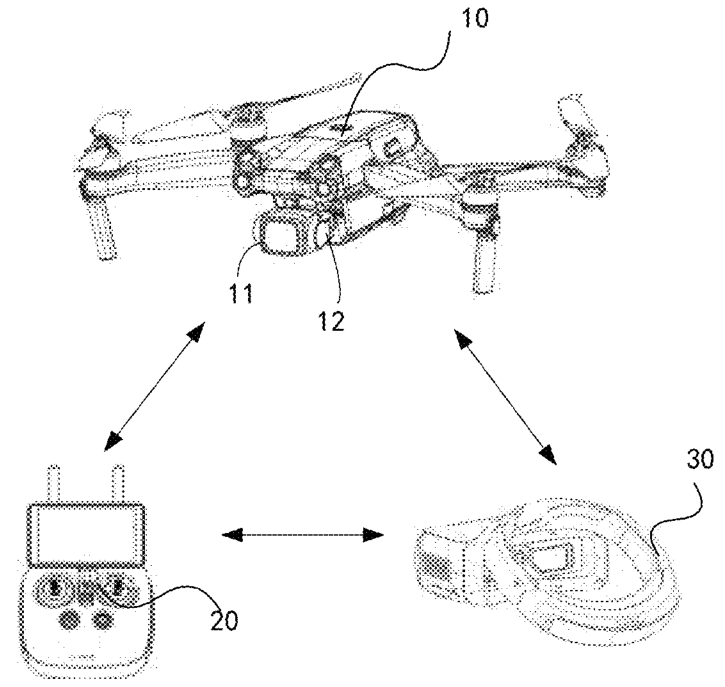
FIG. 1 is a schematic scene diagram of an unmanned aerial vehicle provided by some exemplary embodiments of present disclosure.

Unmanned aerial vehicle 10, remote control 20, smart terminal 30, photographing device 11, gimbal 12; memory 301, processor 302; memory 401, processor 402

DETAILED DESCRIPTION

The following will describe the technical solutions of some exemplary embodiments of present disclosure in conjunction with the accompanying drawings. Clearly, the described embodiments are part of the embodiments of present disclosure, not all of the embodiments.

The purpose of the terms used herein is solely to describe specific embodiments and not to limit the application. When used herein, the singular forms "a," "an," and "the" are also intended to include the plural forms, unless the context explicitly indicates otherwise. It should also be understood that the terms "comprising" and/or "including," when used in this disclosure, indicate the presence of the described features, integers, steps, operations, elements, and/or components, but do not exclude the presence or addition of one or more other features, integers, steps, operations, elements, components, and/or groups. The term "and/or" as used here includes any and all combinations of the listed items. "First" and "second" are used merely for clarity in expression and do not limit the data relationship between them; they can be the same or different. When used here, if A and B are positively correlated, it means that as A increases, B also increases; if A and B are negatively correlated, it means that as A increases, B decreases.

The illustrations in the figures are provided for example purposes only and do not necessarily include all the contents and operations/steps, nor are they required to be executed in the described order. For example, some operations/steps can be decomposed, combined, or partially merged, so the actual execution order may vary depending on the specific situation.

Some exemplary embodiments of present disclosure are applicable to any video transmission/communication scenario involving devices with video capture capabilities. These devices include, but are not limited to, handheld gimbals, action cameras, movable devices directly mounted with or indirectly mounted via a carrier to a photographing device, mobile phones with camera functions, tablet computers, smart wearable devices, computers, and similar electronic devices.

The movable device can be a self-propelled transport vehicle. The transport vehicle includes one or more propulsion units that allow the vehicle to move within an environment. The movable device can traverse on land, underground, on water, in water, in the air, in space, or any combination thereof. The movable device can be an aircraft (e.g., rotary-wing aircraft, fixed-wing aircraft), a ground-based transport vehicle, a water-based transport vehicle, or an air-based transport vehicle. The movable device can be manned or unmanned. It will be apparent to a person skilled in the art that the methods described in the embodiments of this application for unmanned aerial vehicles (UAVs) are also applicable to other types of aircrafts. Any type of aircraft may be used without limitation. For instance, the aircraft may be small or large, manned or unmanned. In some embodiments, the aircraft can be a rotary-wing aircraft, such as a multirotor propelled by air with multiple propulsion devices. The aircraft can also be a fixed-wing aircraft or a hybrid of rotary and fixed wings. The embodiments of this application are not limited to these examples, and the aircraft herein can also include other types of aircrafts. Furthermore, the methods applicable to aircraft in the embodiments of this application are also applicable to movable platforms. A movable platform may refer to any device capable of movement. In some embodiments, the movable platform may have its own power unit, which drives its movement. In other embodiments, the movable platform may require external equipment to facilitate movement. The examples provided herein are for illustrative purposes only, and the specific means of achieving movement for the movable platform are not limited herein. The movable platform may be a manned or unmanned platform. Examples of movable platforms include, but are not limited to, aircraft, vehicles, cleaning devices, ships, tunnel or pipeline inspection equipment, agricultural robots, logistics vehicles, inspection devices, underwater operation equipment, handheld gimbals, action cameras, and so on. In different practical applications, the movable platform can be different types of devices. For instance, in scenarios such as power line inspection, river inspection, or pipeline surveying, the movable platform could be an aircraft. In scenarios like underground pipeline inspection, the movable platform may be an aircraft, a ship, or a mobile robot. Alternatively, the movable platform may be an integrated movable platform capable of navigating air, surface, and underwater environments, or a platform capable of moving both on the ground and in the air, among others.

The carrier may include one or more devices configured to accommodate the photographing device and/or allow the photographing device to be adjusted (e.g., rotated) relative to the movable device. For example, the carrier can be a gimbal. The carrier may be configured to allow the photographing device to rotate around one or more rotational axes, including yaw, pitch, or roll axes, etc. In some scenarios, the carrier may be configured to allow rotation around each axis by 360° or more to better control the photographing device's viewpoint.

Referring to FIG. 1, taking the unmanned aerial vehicle (UAV) scenario in a movable device as an example, the UAV can be a drone or a racing drone. In the UAV aerial photography or first-person view (FPV) flying experience scenario, the UAV 10 flies in the air, with the photographing device 11 mounted on the UAV 10 via a gimbal 12. The photographing device 11 captures a video, which is then transmitted via a wireless video transmission system to the remote control terminal 20. The remote control terminal 20 then sends the video to a smart terminal 30 with display functionality for viewing. In some scenarios, the video captured by the photographing device 11 can also be directly transmitted to the smart terminal 30 for display via the wireless video transmission system. The smart terminal can be wearable devices such as smart glasses, goggles, or head-mounted displays, or user devices like smartphones, computers, and tablets. The smart terminal can include any type of wearable computer or device incorporating augmented reality (AR) or virtual reality (VR) technologies. The user can watch the video captured by the UAV through the smart terminal. For example, by wearing smart glasses, users can experience an immersive aerial photography and racing experience from the perspective of the movable device. For the high-speed flight scenarios of drones or racing drones, the UAV needs to transmit a large amount of video data back to the remote controller or smart terminal, and there are high requirements for real-time or low-latency image or video transmission. Therefore, how to save transmission resources is an urgent problem to solve.

Figure 2:
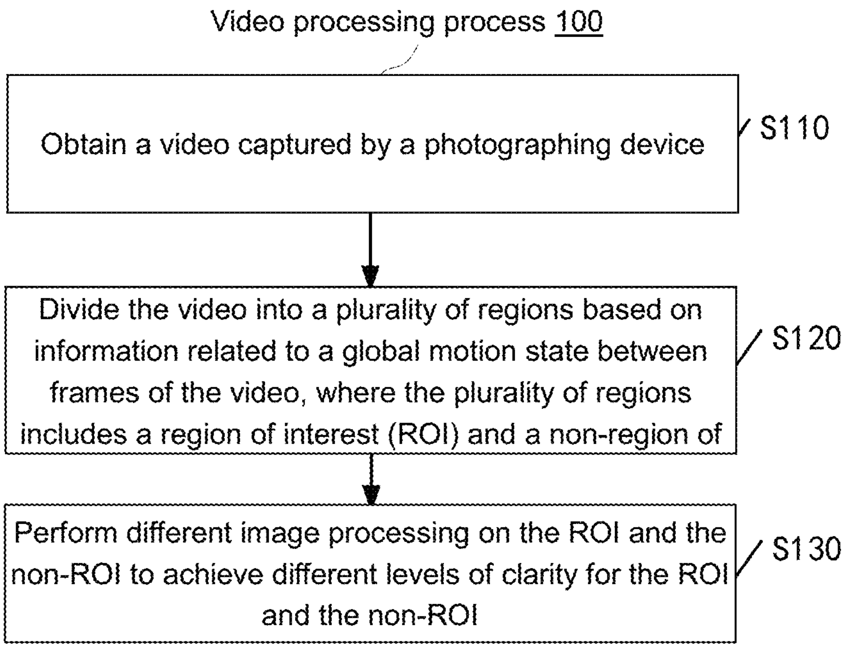
FIG. 2 is a schematic flowchart of a video processing method provided by some exemplary embodiments of present disclosure.

Referring to FIG. 2, FIG. 2 is a schematic flowchart of a video processing method provided by some exemplary embodiments of present disclosure. This video processing method can be executed by a video processing device.

As an example, the method/process 100 includes steps S110 to S130 as described below. Some or all aspects of the process (or any other processes described herein, or variations and/or combinations thereof) may be performed by one or more processors onboard a movable object, a remote control device, any other system or device or a combination thereof. Some or all aspects of the process (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

S110: Obtain a video captured by a photographing device.

S120: Divide the video into a plurality of regions based on information associated with a global motion state between frames of the video, where the plurality of regions includes a region of interest (ROI) and a non-region of interest (non-ROI).

S130: Perform different image processing on the ROI and the non-ROI to achieve different levels of clarity for the ROI and the non-ROI.

The information associated with the global motion state between frames of the video refers to information that reflects the global motion state between the current frame and historical frames, indicating the global changes between the current frame and historical frames. The historical frame can be any frame prior to the current frame. If a global motion change represented by the information associated with the global motion state satisfies a preset change condition, the video is divided into multiple regions. The greater the global motion change between frames, the more intense the global changes between the frames, and the more high-speed motion content that is less sensitive to the human eye in the video, making it more likely to undergo division processing.

In some exemplary embodiments, the information associated with the global motion state between video frames includes at least one of the following or a combination thereof: global motion information between video frames, and information associated with the motion state of a target object. The target object includes at least one of the photographing device or the equipment that carries the photographing device.

It should be noted that, in addition to the above information, other information that reflects the global motion state between the current and historical frames of the video may also be included. Present disclosure does not impose any limitations on this.

In some exemplary embodiments, the global motion information between video frames includes: a global motion vector (GMV) between video frames.

In some exemplary embodiments, the information associated with the motion state of the target object includes: a motion speed of the target object and a relative distance between the target object and a photographed object; or, a motion speed of the target object and a relative height between the target object and a photographed object.

In some scenarios, the target object is the photographing device, and the information associated with the motion state of the target object is the information associated with the motion state of the photographing device. In some other scenarios, considering the accessibility of the information associated with the motion state of the target object, this information may be reflected by the motion state of a device carrying the photographing device. For example, for a handheld gimbal, the information associated with the motion state of the target object can be represented by that of the gimbal carrying the photographing device. For movable devices, when the photographing device is directly mounted on the movable device, the information associated with the motion state of the target object can be represented by the motion state of the movable device. When the photographing device is mounted on the movable device by a carrier, the information associated with the motion state of the target object can be represented by the motion state of the movable device or the carrier. When the movable device is specifically an aircraft, for example, the information associated with the motion state of the target object may include: a flight speed of the aircraft and a relative height between the aircraft and a photographed object. The flight speed and height information of the aircraft can be easily obtained from the aircraft's own navigation system, or by mapping a user's stick input, or by using a motion sensor(s) carried by the carrier, photographing device, or movable device itself. This is not restricted herein.

In some exemplary embodiments, based on the information associated with the global motion state between video frames, the video is divided into a plurality of regions, which includes: if a global motion change represented by the information associated with the global motion state between video frames meets a preset change condition, the video is divided into the plurality of regions. In some exemplary embodiments, if the global motion change represented by the information associated with the global motion state between video frames meets the preset change condition, at least one of the following scenarios applies:

- Scenario 1: when an absolute value of a GMV between video frames is greater than a GMV threshold, the video is divided into the plurality of regions.
- Scenario 2: when a relative height between the target object and the photographed object remains constant, and an absolute value of a motion speed of the target object is greater than a motion speed threshold, the video is divided into the plurality of regions.
- Scenario 3: when a motion speed of the target object remains constant and a relative height between the target object and the photographed object is less than a height threshold, the video is divided into the plurality of regions.

It should be noted that any one of the above scenarios or multiple scenarios meeting the conditions can trigger the step of dividing the video into multiple regions. In addition to the above scenarios, other information that can reflect the global motion state between the current and historical frames of the video may also be used as the basis for division. Present disclosure does not impose any limitations on this.

It should be noted that in this context, the motion speed of the target object and the relative distance between the target object and the photographed object are used as examples. In other scenarios, such as in the case of an aircraft, information associated with the motion state of the target object, such as the motion speed of the target object and the relative height between the target object and the photographed object, can also be used in the same way. This applies throughout the following text. Additionally, the relative height between the target object and the photographed object can have other forms, such as the height of the target object relative to the ground or the height of the target object from a starting point (e.g., the takeoff point).

In some exemplary embodiments, when transmission resources are sufficient, meaning that the transmission conditions of the transmission device corresponding to the photographing device meet the preset transmission conditions, the video processing device does not perform the division of ROI and non-ROI regions. In this case, the image quality of the entire video remains high, and there is no need to sacrifice the image quality of the non-ROI region(s) to improve the image quality of the ROI region(s). In the case of insufficient transmission resources, meaning that the transmission adjustment of the transmission device corresponding to the photographing device does not meet the preset transmission conditions, the video processing device divides the video into multiple regions based on the information associated with the global motion state between video frames. In some exemplary embodiments, the transmission conditions can be represented by the transmission bitrate. A transmission bitrate above a bitrate threshold can be a specific scenario where the transmission conditions meet the preset conditions, while a transmission bitrate below the bitrate threshold can be a specific scenario where the transmission conditions do not meet the preset conditions. It should also be understood that, in addition to transmission bitrate, other information reflecting the transmission conditions of the transmission device can also be used for judgment. Present disclosure does not impose any limitations on this.

Figure 3:
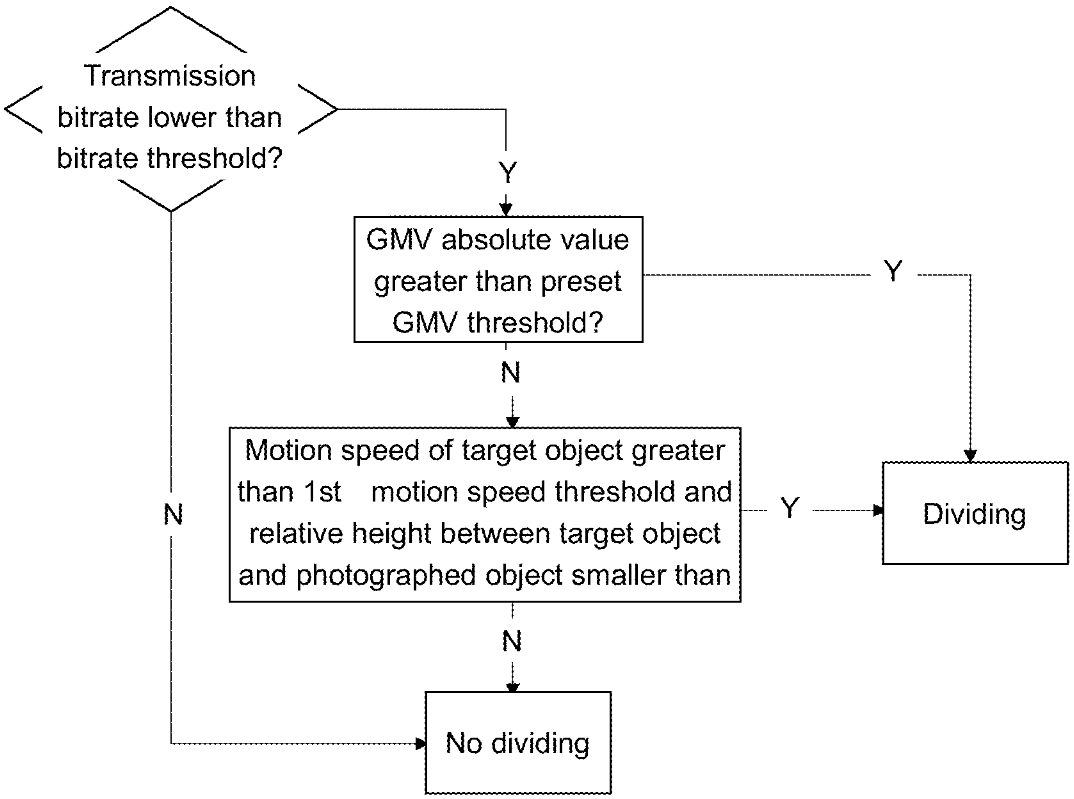
FIG. 3 is a flowchart of a division process of multiple regions in a video provided by some exemplary embodiments of present disclosure.

In some exemplary embodiments, referring to FIG. 3, some exemplary embodiments of the application provide a specific method for determining the division of the ROI and the non-ROI. The specific steps are as follows:

The video processing device first determines whether the transmission bitrate of the transmission device corresponding to the photographing device is lower than a bitrate threshold. If not, no division is performed.

If it is, the video processing device further determines whether an absolute value of a GMV between frames of the video exceeds a GMV threshold. If it does, division is performed.

If not, the video processing device further determines whether a motion speed of the target object exceeds a first motion speed threshold and whether a relative height between the target object and the photographed object is less than a first height threshold. If it is, division is performed.

If not, no division is performed.

It should be noted that, at a constant motion speed of the target object, the smaller the relative height between the target object and the photographed object, the more significant a global change between the frames. Conversely, with a constant relative height between the target object and the photographed object, the greater the motion speed of the target object, the more significant a global change between the frames. In certain scenarios, the motion speed threshold of the target object and the relative height threshold between the target object and the photographed object can be set to multiple levels. At the same motion speed but meeting different height threshold conditions, different division determination results may correspond. Similarly, at the same relative height but meeting different motion speed threshold conditions, different division determination results may also correspond. The relationship between the motion speed of the target object and its relative distance to the photographed object follows the same principle and will not be elaborated further.

It should be noted that, in the above embodiments, the execution order of the determination of the preset transmission conditions and the determination of information associated with the global motion state between frames of the video is not restricted. When multiple pieces of information associated with the global motion state between frames of the video are combined, the execution order of determinations among these pieces of information is also not restricted. In addition to the specific method for determining the division between the ROI and non-ROI regions described above, other optional division determination methods can be selected based on their adaptability to the actual scenario, and these will not be further elaborated herein.

In some exemplary embodiments, after step S110 but before step S130, the method may also include: based on information associated with the global motion state between frames of the video, the video processing device determines an area of the ROI and/or an area of the non-ROI. On the premise of ensuring the subjective quality of the user's visual experience, the video processing device adaptively adjusts the allocation of transmission resources between the ROI and non-ROI regions based on the information associated with the global motion state between frames of the video.

In some exemplary embodiments, the area of the ROI (Region of Interest) is negatively correlated with the global motion change characterized by the information associated with the inter-frame global motion state of the video. Conversely, the area of the non-ROI is positively correlated with the global motion change characterized by such information. In this context, the greater the global motion change of the target object, the more intense the inter-frame global change in the video, and the more high-speed motion content insensitive to the human eye appears in the image. As a result, the area of the ROI can be set smaller, while the area of the non-ROI region can be set larger. This adjustment can lead to greater savings in overall transmission resources. In some exemplary embodiments, the adjustment method for the area of the ROI and/or non-ROI includes at least one of the following scenarios:

Scenario 1: the area of the ROI is negatively correlated with the absolute value of the GMV between video frames (for example, the larger the absolute value, the smaller the area of the ROI), and/or the area of the non-ROI is positively correlated with the absolute value of the GMV between video frames (for example, the larger the absolute value, the larger the area of the non-ROI).

Scenario 2: when the relative height between the target object and the photographed object remains constant, the area of the ROI is negatively correlated with the absolute value of the target object's motion speed, and/or the area of the non-ROI is positively correlated with the absolute value of the target object's motion speed.

Scenario 3: when the motion speed of the target object remains constant, the area of the ROI is positively correlated with the relative height between the target object and the photographed object, and/or the area of the non-ROI is negatively correlated with the relative height between the target object and the photographed object.

It should be noted that any one of the above-mentioned scenarios, or a combination of multiple scenarios, can trigger a dynamic adjustment of the area of the ROI and/or non-ROI in the video. In addition to the aforementioned scenarios, other scenarios that utilize information reflecting the global motion state correlation between the current and historical frames of the video to adjust the area of the ROI and/or non-ROI may also be included. Present disclosure places no restrictions on such scenarios.

It should be noted that, when the information associated with the inter-frame global motion state of the video remains constant, the size of the entire image is represented by the field of view (FOV) of the photographing device, and the area of the ROI and/or non-ROI is positively correlated with the FOV size.

Additionally, in the above-mentioned embodiments, when transmission resources are sufficient, i.e., when the transmission conditions of the transmission device corresponding to the photographing device meet the preset transmission conditions, the video processing device may not dynamically adjust the areas of the ROI and non-ROI in the video. However, when transmission resources are insufficient, i.e., when the transmission adjustment conditions of the transmission device corresponding to the photographing device do not meet the preset transmission conditions, the video processing device may dynamically adjust the areas of the ROI and non-ROI based on the information associated with the inter-frame global motion state of the video. In some exemplary embodiments, the transmission conditions can be represented by the transmission bitrate. If the transmission bitrate exceeds a threshold, it could be a specific case where the transmission conditions meet the preset conditions, and if the bitrate falls below the threshold, it could indicate that the transmission conditions do not meet the preset conditions. It should also be understood that, in addition to transmission bitrate, other information reflecting the transmission conditions of the transmission device can also be used for determining, and present disclosure does not impose any restrictions in this regard.

Some exemplary embodiments of present disclosure provide a specific method for dynamically adjusting the area of the ROI. Depending on the transmission conditions of the transmission device, transmission bitrate is used as an example for explanation. It should also be understood that, in addition to using bitrate for determination, other information that can reflect the transmission conditions of the transmission device can also be used for adjustment, and present disclosure imposes no restrictions in this regard. The following includes at least one of the following scenarios:

Scenario 1: The transmission bitrate is below a first bitrate threshold.

1) If an absolute value of the inter-frame GMV is greater than the first GMV threshold, or if the motion speed of the target object is greater than a first motion speed threshold and a relative height is less than a first height threshold, then the area of the ROI is determined to be ¼ of an FOV.
2) If an absolute value of the inter-frame GMV is greater than a second GMV threshold but less than a first GMV threshold, or if a motion speed of the target object is less than a first motion speed threshold but greater than a second motion speed threshold and a relative height is less than a second height threshold, then the area of the ROI is determined to be ⅓ of an FOV.
3) Otherwise, the area of the ROI is determined to be ½ of an FOV.

Scenario 2: The transmission bitrate is higher than a first bitrate threshold but lower than a second bitrate threshold.

1) If an absolute value of the inter-frame GMV is greater than a first GMV threshold, or if a motion speed of the target object is greater than a first motion speed threshold and a relative height is less than a first height threshold, then the area of the ROI is determined to be ⅓ of an FOV.
2) If an absolute value of the inter-frame GMV is greater than a second GMV threshold but less than a first GMV threshold, or if a motion speed of the target object is less than a first motion speed threshold but greater than a second motion speed threshold and a relative height is less than a second height threshold, then the area of the ROI region is determined to be ½ of an FOV.
3) Otherwise, the area of the ROI is determined to be ⅔ of an FOV.

The first bitrate threshold is smaller than the second bitrate threshold, the first GMV threshold is greater than the second GMV threshold, the first motion speed threshold is greater than the second motion speed threshold, and the first height threshold is greater than the second height threshold. It should also be understood that the classification of transmission bitrate thresholds, GMV thresholds, motion speed thresholds, and relative height thresholds into several levels is not restricted herein.

In some exemplary embodiments, when the information associated with the inter-frame global motion state of the video remains constant, the area of the ROI is positively correlated with the transmission resources. For example, as the transmission bitrate decreases, the area of the ROI becomes smaller.

In some exemplary embodiments, in order to avoid unlimited enlargement or reduction of the ROI's proportion in an image, a threshold can be set for the proportion of the ROI in the entire image. For example, a minimum and maximum proportion relative to the FOV can be defined to ensure that the dynamic adjustment remains within a reasonable range.

It should be noted that, in addition to the above adjustment methods, other ways of dynamically adjusting the area of the ROI and/or non-ROI, such as those that do not consider transmission resource limitations, can also be adaptively selected based on the actual scenario. This will not be further elaborated herein.

In some exemplary embodiments, the method/process 100 may further include: based on information associated with a change in an attitude the target object, the video processing device determines the positional change of the ROI.

When the target object's attitude changes, such as when an aircraft makes a turning motion or the gimbal's viewpoint changes, the video processing device adaptively adjusts the position of the ROI in the frame to enhance the user's visual experience. For example, when the gimbal's viewpoint changes, this can lead to an attitude change in at least one axis, such as yaw, pitch, or roll.

The information associated with the target object's attitude change can be user input, such as in the case of an aircraft scenario where the user's joystick movement is mapped to the change. The greater the joystick movement, the greater the offset of the ROI's center position in the frame. Alternatively, this information can be obtained using an attitude sensor(s) carried by the gimbal, photographing device, or movable device.

In some exemplary embodiments, in order to prevent the ROI position shifts caused by unstable control or system errors, the video processing device can preset an attitude change threshold. If the information associated with the target object's attitude change meets the preset condition (e.g., if the information associated with the attitude change exceeds the threshold), then the position of the ROI is adjusted accordingly. If the information associated with the target object's attitude change is below the threshold, it is considered to be due to unstable control or system errors (e.g., unexpected jitter). In this case, the position of the ROI and/or non-ROI will not follow the change.

A horizontal displacement of the ROI is positively correlated with a horizontal component of the information associated with the target object's attitude change, and/or a vertical displacement of the ROI is positively correlated with a vertical component of the information associated with the target object's attitude change.

The information associated with the target object's attitude change includes at least one of the following: an attitude change in speed, an attitude change in linear velocity, an attitude change in angular velocity, an attitude change in acceleration, or an attitude change in angular acceleration. For example, when angular velocity is used to represent attitude change, the angular change can be decomposed into horizontal and vertical components. These components should be understood as vectors that include both direction and magnitude. The horizontal displacement of the ROI is positively correlated with the horizontal component of the target object's attitude change in angular velocity, and/or the vertical displacement of the ROI is positively correlated with the vertical component of the target object's attitude change in angular velocity.

Figure 4:
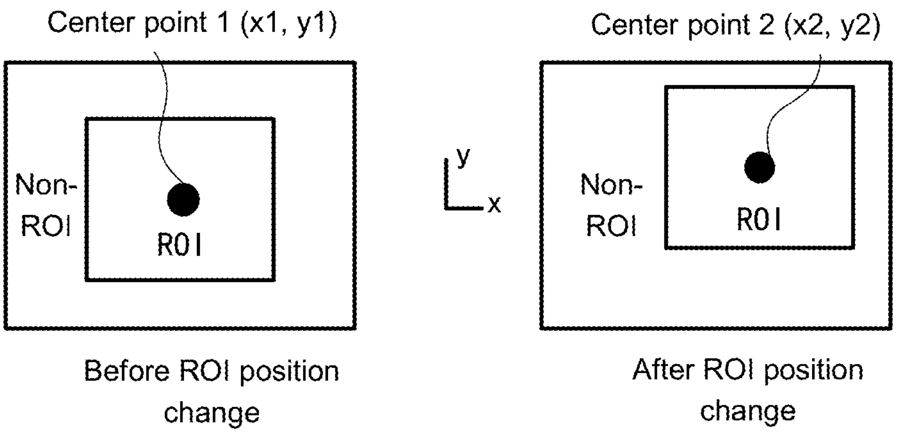
FIG. 4 is a schematic diagram of a position change(s) of an ROI region in a video provided by some exemplary embodiments of present disclosure.

In some exemplary embodiments, as shown in FIG. 4, a position change of the ROI can be represented by the coordinate change of a feature point within the ROI. For example, in an unmanned flight scenario, the user's gaze is typically focused on the center of a wearable device, so the coordinate change of the ROI's center point can be used to reflect the position change of the ROI. In FIG. 4, the center point of the ROI moves from point 1 (x1, y1) to point 2 (x2, y2), where x2 is obtained by adding the horizontal offset component to x1, and y2 is obtained by adding the vertical offset component to y1. Herein, the horizontal offset component of the ROI's center point is positively correlated with the horizontal component of the information associated with the target object's attitude change, and the vertical offset component of the ROI's center point is positively correlated with the vertical component of the information associated with the target object's attitude change.

In some exemplary embodiments, the video processing device performs different image processing on the ROI and non-ROI to create different levels of clarity between them.

In this context, the clarity of the non-ROI is lower than that of the ROI.

When the information associated with the inter-frame global motion state of the video remains constant, the clarity of the ROI and/or non-ROI is related to the transmission conditions of the transmission device corresponding to the photographing device. For example, the clarity of the ROI and/or non-ROI decreases as the transmission bitrate decreases.

The division of the ROI and non-ROI includes but is not limited to: rectangular, square, circular, elliptical, triangular, or any other suitable shape. Present disclosure imposes no restrictions on this.

In some exemplary embodiments, the region outside the ROI can include multiple non-ROIs, with clarity progressively changing. For example, this can include a first non-ROI close to the ROI and a second non-ROI farther from the ROI, where the clarity of the first non-ROI is higher than that of the second non-ROI.

In some exemplary embodiments, the ROI itself can include multiple ROIs, with clarity gradually changing from outer to inner regions. The outer ROI region has lower clarity than the inner ROI region.

The progressive change in clarity described above ensures a smooth transition, which can better align with the comfort of the human eye, avoiding uncomfortable visual effects caused by abrupt changes in clarity.

In some exemplary embodiments, the video processing device performs different image processing on the ROI and non-ROI, including at least one of the following scenarios:

Apply a blur effect to the non-ROI.

Apply a sharpening effect to the ROI while blurring the non-ROI, optimizing both regions jointly.

Perform different image processing on the ROI and non-ROI to ensure that the quantization parameter (QP) of the ROI is smaller than the QP of the non-ROI.

For example, when the video processing device encodes the pixels in the ROI, the QP parameter used is smaller than the QP parameter used for encoding the pixels in the non-ROI.

It should be noted that any other method capable of creating different clarity between the ROI and non-ROI regions should be understood as part of the "different image processing" referred to in present disclosure.

It should also be noted that the execution entity of the above method/process 100 can include: a camera, handheld gimbal, action camera, movable device, mobile phone, tablet, smart wearable device, computer, or similar devices. In other possible implementations, the photographing device, gimbal carrying the photographing device, or movable device can upload the video and the information associated with the inter-frame global motion state of the video to a cloud server or third-party device for data processing. The processed results from the cloud server or third-party device are then received, and based on the feedback; different image processing can be applied to the ROI and non-ROI. By utilizing the high computational performance of cloud servers or third-party devices, local processing efficiency can be improved.

The embodiments of present disclosure fully consider the human eye's insensitivity to high-speed motion content. The video processing device determines whether to divide the video into multiple regions based on information associated with the inter-frame global motion state of the video. These multiple regions include ROI and non-ROI regions. In some exemplary embodiments, the video processing device dynamically and adaptively adjusts the area of the ROI and non-ROI regions in the frame based on information associated with the inter-frame global motion state, in order to effectively save transmission resources while maintaining subjective visual quality for the user. In some exemplary embodiments, the video processing device also determines the position change of the ROI and non-ROI regions based on information associated with the target object's attitude change, allowing for automatic correction of the positions of the ROI and non-ROI regions in scenarios where the target object's attitude changes.

In some exemplary embodiments, in some exemplary embodiments, to avoid the user's subjective visual experience of flickering caused by frequent switching between the scenarios of dividing and not dividing the video into regions, when it is determined that the video needs to switch from the "no division" to the "division" state, the video processing device can perform a gradual transition over a period of time T1 (multiple frames). Similarly, when it is determined that the video should switch from the "division" state to the "no division" state, the video processing device can perform a gradual transition over a period of time T2. Gradual transitions, compared to instantaneous flickering, are better suited for the visual adaptation of the human eye, avoiding visual fatigue. T1 and T2 can be the same or different and can be set according to actual needs. For example, the video processing device can use time-domain filtering to transition from dividing the regions in adjacent frames to dividing the ROI and non-ROI regions across multiple consecutive frames, which helps avoid poor user experience caused by sudden changes in the video image.

Figure 5:
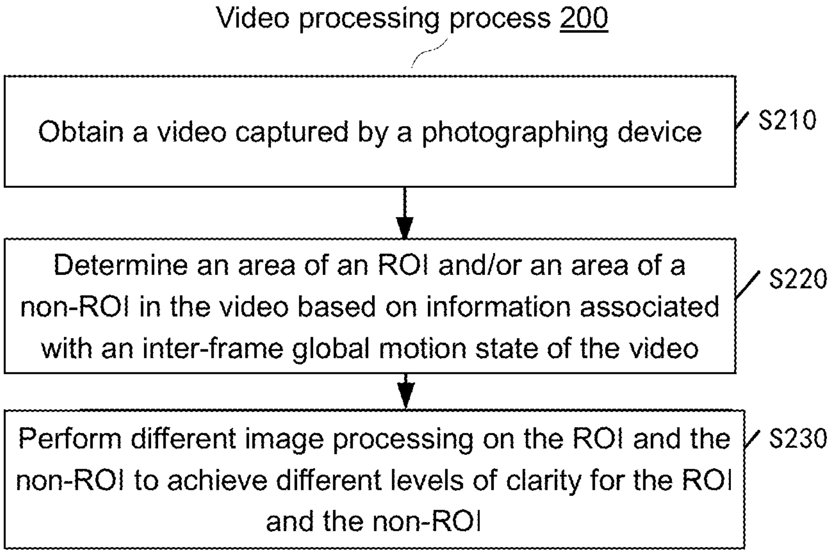
FIG. 5 is a schematic flowchart of a video processing method provided by some exemplary embodiments of present disclosure.

Referring to FIG. 5, this embodiment of the application also provides a video processing method/process 200.

As an example, the method/process 200 includes steps S210 to S230:

S210: Obtain a video captured by a photographing device.

S220: Determine an area of an ROI and/or an area of a non-ROI in the video based on information associated with an inter-frame global motion state of the video.

S230: Perform different image processing on the ROI and non-ROI to achieve different clarity levels between the ROI and the non-ROI.

The method/process 200 involves dynamically adjusting the areas of the ROI and/or non-ROI regions in the video. The specific operation for dynamically adjusting the area, as well as the operation of determining the position change of the ROI region based on information associated with the target object's attitude change, follows principles similar to those described in method 100. To keep it concise, this will not be elaborated on again herein. The method/process 200 does not impose any special restrictions on how the ROI and non-ROI regions in the video are divided or the basis for their division.

In some exemplary embodiments, in some exemplary embodiments, to avoid the subjective visual flicker experience caused by frequent switching between the scenarios of dividing and not dividing the ROI and non-ROI regions, when it is determined that the video needs to switch from "no division" to "division," a gradual transition can be performed over a period of time T1 (multiple frames). Similarly, when it is determined that the video should switch from "division" to "no division," a gradual transition can be completed over a period of time T2. Gradual transitions, compared to instantaneous flicker, are more conducive to visual adaptation and help prevent eye fatigue. T1 and T2 can be the same or different and can be set according to actual needs. For example, time-domain filtering can be used to transition from the "no division" to the "division" of the ROI and non-ROI regions not within adjacent frames, but over multiple consecutive frames, thereby avoiding the poor user experience caused by sudden jumps in the video.

The embodiments of present disclosure fully consider the human eye's insensitivity to high-speed motion content. Based on information associated with the inter-frame global motion state of the video, the areas of the ROI and non-ROI regions in the video is dynamically and adaptively adjusted. This approach ensures the effective saving of transmission resources while maintaining the subjective video quality for the user. In some exemplary embodiments, the position of the ROI and non-ROI regions can also be adjusted based on information associated with the target object's attitude change, allowing for automatic correction of the ROI and non-ROI region positions when the target object's attitude changes.

Figure 6:
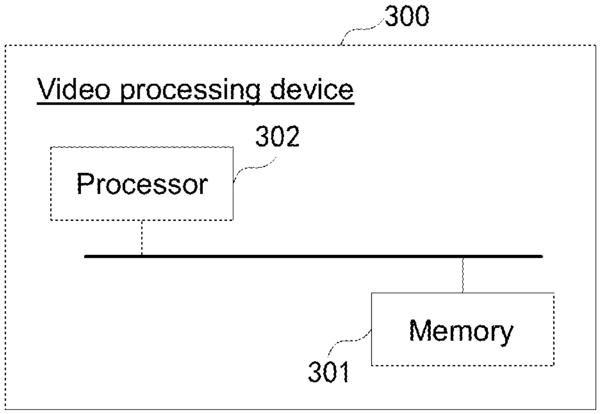
FIG. 6 is a schematic block diagram of a video processing device provided by some exemplary embodiments of present disclosure.

Referring to FIG. 6, some exemplary embodiments provide a video processing device 300. The device 300 includes:

A memory 301 to store a computer program(s);

A processor 302 to invoke the computer program(s), when the computer program is executed by the processor, the video processing device performs the following operations:

Obtain a video captured by a photographing device;

Divide the video into a plurality of regions based on information associated with an inter-frame global motion state of the video, where the plurality of regions includes an ROI and a non-ROI; and Perform different image processing on the ROI and non-ROI to achieve different levels of clarity between the ROI and the non-ROI.

It should be noted that the specific implementation of the operations executed by the processor 302 can refer to the related descriptions in the previous method/process 100, and will not be repeated herein. Moreover, The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Figure 7:
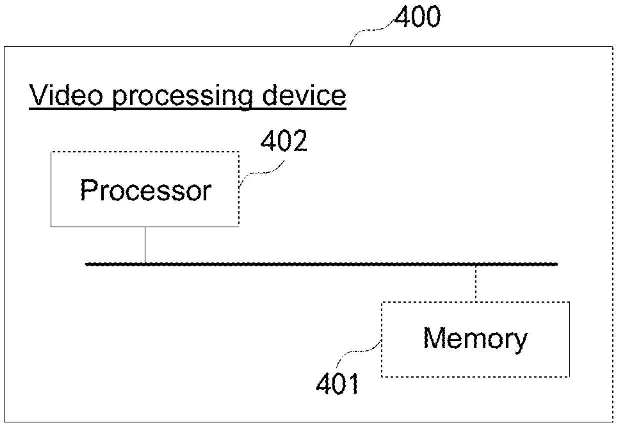
FIG. 7 is a schematic block diagram of a video processing device provided some exemplary embodiments of present disclosure.

Referring to FIG. 7, some exemplary embodiments provide a video processing device 400. The device 400 includes:

A memory 401 to store a computer program(s);

A processor 402 to invoke the computer program(s), when the computer program is executed by the processor, the video processing device performs the following operations:

Obtain a video captured by a photographing device;

Determine an area of an ROI and/or an area of a non-ROI in the video based on information associated with an inter-frame global motion state of the video; and Perform different image processing on the ROI and the non-ROI to achieve different levels of clarity between the ROI and the non-ROI.

It should be noted that the specific implementation of the operations executed by the processor 402 can refer to the relevant descriptions in the previous method/process 200, and will not be repeated herein.

Specifically, the processor 302 or processor 402 can be a microcontroller unit (MCU), central processing unit (CPU), or digital signal processor (DSP), among others. The memory 301 or 401 can be a Flash chip, read-only memory (ROM), disk, optical disk, USB flash drive, or external hard drive, etc.

The processor is responsible for running the computer programs stored in the memory and performing the video processing operations described in the video processing methods when executing the programs.

The specific principles and implementation methods of the video processing device provided herein are similar to the video processing methods described in the corresponding embodiments above and will not be repeated herein.

Some exemplary embodiments of present disclosure further provide an apparatus, which includes:

A photographing device, which is mounted on the apparatus;

A video processing device, as described in the previous embodiments.

In some exemplary embodiments, the apparatus can include, but is not limited to: handheld gimbals, action cameras, mobile devices, smartphones, tablets, smart wearable devices, and computers.

Some exemplary embodiments of present disclosure further provide a computer storage medium, which stores a computer program(s). When the computer program is executed by a processor, it enables the processor to implement the steps of the video processing method provided in the embodiments described above.

The computer storage medium may store one or more computer program instructions. The processor can execute the program instructions stored in the storage device to realize the functions and/or other desired functions in this embodiment (implemented by the processor), such as executing the corresponding steps of the video processing method according to the embodiments of the present disclosure. Additionally, the computer storage medium may also store various application programs and various data, such as data generated and/or used by application programs.

It should be understood that the terms used in present disclosure are for the purpose of describing specific embodiments and are not intended to limit the application.

The above is only a specific embodiment of present disclosure, and the scope of protection of present disclosure is not limited to it. A person skilled in the art can easily think of various equivalent modifications or substitutions within the technical scope disclosed in present disclosure, and these modifications or substitutions should all fall within the scope of protection of present disclosure. Therefore, the scope of protection of present disclosure should be determined by the claims.

What is claimed is:

1. A video processing method, comprising:

obtaining a video captured by a photographing device;

dividing the video into a plurality of regions based on information associated with a global motion state between frames of the video, wherein the plurality of regions includes a region of interest (ROI) and a non-region of interest (non-ROI); and performing different image processing on the ROI and the non-ROI to achieve different levels of clarity for the ROI and the non-ROI, wherein a clarity of the non-ROI is lower than a clarity of the ROI; the non-ROI includes a first non-ROI close to the ROI and a second non-ROI farther from the ROI, and a clarity of the first non-ROI is higher than a clarity of the second non-ROI.

2. The method according to claim 1, wherein the dividing of the video into the plurality of regions based on the information associated with the global motion state between the frames of the video includes:

in a case where a transmission condition of a transmission device corresponding to the photographing device does not meet a preset transmission condition, dividing the video into the plurality of regions based on the information associated with the global motion state between the frames of the video.

3. The method according to claim 1, wherein the dividing of the video into the plurality of regions based on the information associated with the global motion state between the frames of the video includes:

in response to determining that a global motion change characterized by the information associated with the global motion state between frames of the video satisfies a preset change condition, dividing the video into the plurality of regions.

4. The method according to claim 1, wherein the information associated with the global motion state between the frames of the video includes at least one of:

global motion information between the frames of the video;

information associated with the motion state of a target object, wherein the target object includes at least one of the photographing device or a device carrying the photographing device.

5. The method according to claim 4, wherein the information associated with the motion state of the target object includes: a motion speed of the target object; and a relative distance or relative height between the target object and the photographed object.

6. The method according to claim 5, wherein the dividing of the video into the plurality of regions based on the information associated with the global motion state between the frames of the video includes at least one of:

in response to determining that the relative distance or relative height between the target object and the photographed object remains constant, when an absolute value of the motion speed of the target object exceeds a motion speed threshold, dividing the video into the plurality of regions; or in response to determining that the motion speed of the target object remains constant, when the relative distance between the target object and the photographed object is less than a distance threshold or the relative height is less than a height threshold, dividing the video into the plurality of regions.

7. The method according to claim 1, further comprising:

determining, based on the information associated with the global motion state between the frames of the video, at least one of an area of the ROI or an area of the non-ROI.

8. The method according to claim 7, wherein the ROI and non-ROI satisfy at least one of:

the area of the ROI is negatively correlated with the global motion change characterized by the information associated with the global motion state between the frames of the video; or the area of the non-ROI is positively correlated with the global motion change characterized by the information associated with the global motion state between the frames of the video.

9. The method according to claim 7, wherein the method is implemented according to one of the following strategies:

in response to determining that the global motion information between the frames of the video includes the global motion vector between the frames of the video, at least the area of the ROI is negatively correlated with the absolute value of the global motion vector between the frames of the video, or the area of the non-ROI is positively correlated with the absolute value of the global motion vector between the frames of the video;

in response to determining that the information associated with the motion state of the target object includes the motion speed of the target object and the relative distance or relative height between the target object and the photographed object, and the relative distance/relative height between the target object and the photographed object remains constant, at least the area of the ROI is negatively correlated with the absolute value of the motion speed of the target object, or the area of the non-ROI is positively correlated with the absolute value of the motion speed of the target object;

in response to determining that the information associated with the motion state of the target object includes the motion speed of the target object and the relative distance or relative height between the target object and the photographed object, and the motion speed of the target object remains constant, at least the area of the ROI is positively correlated with the relative distance or relative height between the target object and the photographed object, or the area of the non-ROI is negatively correlated with the relative distance or relative height between the target object and the photographed object;

in response to determining that the information associated with the global motion state between frames of the video remains constant, at least one of the area of the ROI or the area of the non-ROI is positively correlated with a field of view angle of the photographing device.

10. The method according to claim 1, further comprising:

determining, based on information associated with an attitude change of the target object, a position change of the ROI, wherein the target object includes at least one of the photographing device or a device carrying the photographing device.

11. The method according to claim 10, wherein the determining, based on information associated with an attitude change of the target object, a position change of the ROI includes at least one of:

in response to determining that the information associated with the attitude change of the target object satisfies a preset condition, determining the position change of the ROI; or the position change of the ROI includes at least one of a horizontal displacement or a vertical displacement of the ROI.

12. The method according to claim 1, wherein in response to determining that the information associated with the global motion state between the frames of the video remains constant, at least one of the clarity of the ROI or the clarity of the non-ROI is related to a transmission condition corresponding to a transmission device associated with the photographing device.

13. The method according to claim 12, wherein the transmission condition includes a transmission bitrate, and the clarity of at least one of the ROI or the non-ROI decreases as the transmission bitrate decreases.

14. The method according to claim 1, wherein the performing of different image processing on the ROI and the non-ROI to achieve different levels of clarity for the ROI and the non-ROI includes: performing blurring on the non-ROI; or performing different image processing on the ROI and the non-ROI such that a quantization parameter of the ROI is smaller than a quantization parameter of the non-ROI.

15. The method according to claim 14, characterized in that the performing of blurring on the non-ROI includes:

performing sharpness enhancement on the ROI and performing blurring on the non-ROI.

16. A video processing device, comprising:

at least one storage medium storing at least one set of instructions; and at least one processor in communication with the at least one storage medium, wherein during operation, the at least one processor executes the at least one set of instructions to cause the device to at least:

obtain a video captured by a photographing device, divide the video into a plurality of regions based on information associated with a global motion state between frames of the video, wherein the plurality of regions includes a region of interest (ROI) and a non-region of interest (non-ROI), and perform different image processing on the ROI and the non-ROI to achieve different levels of clarity for the ROI and the non-ROI, wherein a clarity of the non-ROI is lower than a clarity of the ROI; the non-ROI includes a first non-ROI close to the ROI and a second non-ROI farther from the ROI, and a clarity of the first non-ROI is higher than a clarity of the second non-ROI.

17. An apparatus, comprising:

a photographing device, mounted on the apparatus;

at least one storage medium storing at least one set of instructions; and at least one processor in communication with the at least one storage medium, wherein during operation, the at least one processor executes the at least one set of instructions to cause the apparatus to at least:

obtain a video captured by the photographing device, divide the video into a plurality of regions based on information associated with a global motion state between frames of the video, wherein the plurality of regions includes a region of interest (ROI) and a non-region of interest (non-ROI), and perform different image processing on the ROI and the non-ROI to achieve different levels of clarity for the ROI and the non-ROI, wherein a clarity of the non-ROI is lower than a clarity of the ROI; the non-ROI includes a first non-ROI close to the ROI and a second non-ROI farther from the ROI, and a clarity of the first non-ROI is higher than a clarity of the second non-ROI.

18. The apparatus according to claim 17, wherein the apparatus comprises any one of a mobile phone, a tablet computer, a smart wearable device, a handheld gimbal, and a movable device.

* * * * *